INVENTOR
GILBERT RICHARD

BY Lucke + Lucke
AGENTS

Patented Oct. 5, 1954

2,690,811

UNITED STATES PATENT OFFICE 2,690,811

ROTARY BLADE DEVICE FOR AIRCRAFT

Gilbert Richard, Epone, France

Application January 24, 1950, Serial No. 140,233

1 Claim. (Cl. 170—160.25)

The present invention relates to rotary wing or blade devices for use on aircrafts, said devices being of the type mounted to rotate about an axis making a relatively small angle with the horizontal so as to obtain both the lift and the propulsion necessary for flying the aircraft. For this purpose, the device includes a rotor in the form of a conventional airscrew which, in addition to its rotation about the above mentioned axis, is given an oscillating movement of rotation about an axis extending in the tip to tip direction.

The object of my invention is to provide a device of this kind which is better adapted to meet the requirements of practice than those used up to this time.

A preferred embodiment of my invention will be hereinafter described with reference to the accompanying drawings, given merely by way of example, and in which.

Figure 1:
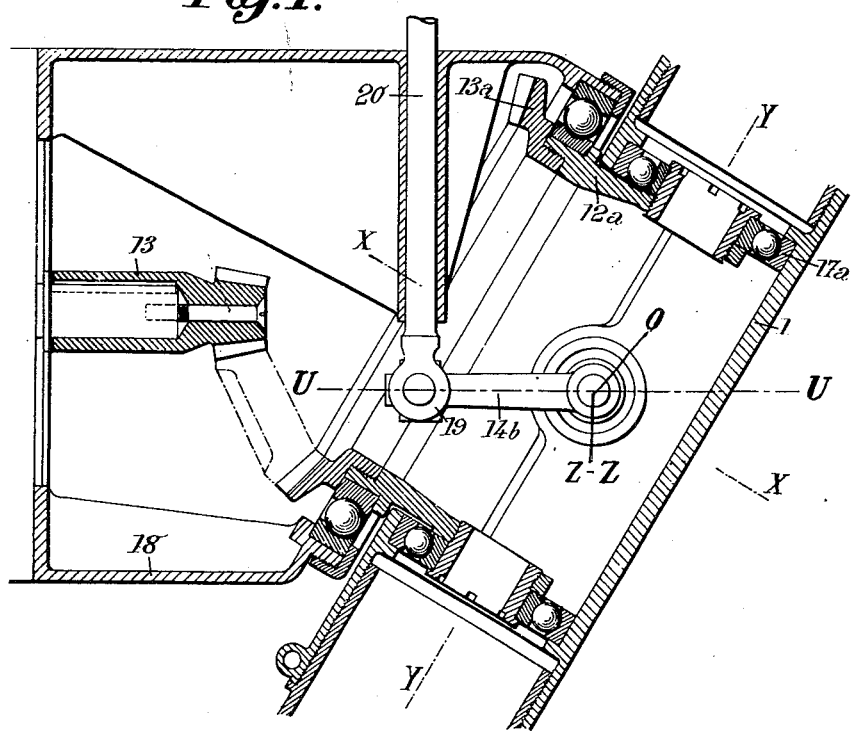
Fig. 1 is a vertical sectional view of an embodiment of my invention.
Figure 2:
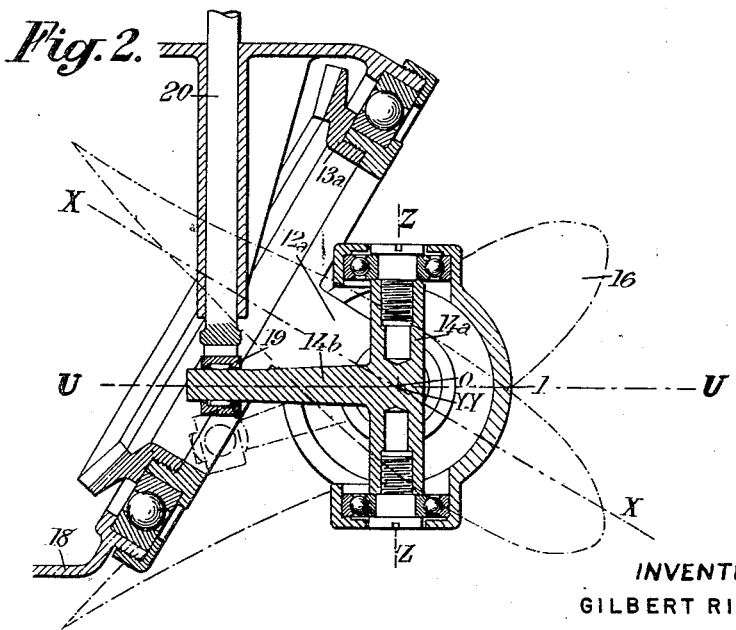
Fig. 2 is a view similar to Fig. 1 corresponding to a position of the rotor at 90° to that shown by Fig. 1.

The device according to my invention illustrated by Figs. 1 and 2 includes a rotor having two blades 16 mounted rigidly on a hub 1. These blades have a fixed pitch and form a whole similar to an ordinary airscrew.

The rotor is driven by an annular member 13a journalled in the aircraft frame 18 about axis X—X and itself driven from a shaft 13 also journalled in said frame about a horizontal axis. Hub 1 is pivoted to driving member 13a about an axis Y—Y at right angles to X—X by means of ball bearings 17a carried by a support 12a fixed to driving member 13a.

Hub 1 carries, journalled therein about an axis Z—Z at right angles to Y—Y, a part 14a (Fig. 2) carrying, rigid therewith, a spindle 14b journalled with some play in a bearing 19 carried by the end of a rod 20 slidable in frame 18 in a substantially vertical direction. Thus, axis Z—Z rotates about the axis U—U of spindle 14b, at right angles thereto, and constantly passes through the point of intersection O of axes X—X and Y—Y.

In this embodiment of my invention, the tip to tip direction of blades 16 is that of axis Y—Y.

This device works as follows:

When the rotor rotates through an angle about axis X—X, for instance through an angle of 90° from the position of Fig. 1 to that of Fig. 2, point O, located on axis X—X, remains fixed in space. Axis U—U remains fixed in space since neither journal 19 nor point O have moved. Since axis Z—Z is perpendicular both to axis U—U and to axis Y—Y it must remain perpendicular to the plane defined by these two axes, to wit U—U and Y—Y. This plane, in Fig. 1 is the plane of the drawing and in Fig. 2 it is a plane perpendicular to the drawing and passing through U—U. Therefore in the position of Fig. 1, axis Z—Z is at right angles to the plane of the drawing and in the position of Fig. 2, it is in the plane of the drawing and at right angles to U—U. Now, as shown by the drawing, in the position of Fig. 1 axis Z—Z is at right angles to fixed axis X—X, whereas in the position of Fig. 2 axis Z—Z makes an acute angle with fixed axis X—X. Therefore axis Z—Z has, in addition to its movement of rotation about X—X, a reciprocating angular movement about axis Y—Y. Since hub 1 has one diameter thereof fixed with respect to part 14b and therefore axis Z—Z, the blades 16 carried by said hub 1 have, in addition to a rotation of their axis Y—Y about X—X, an oscillatory angular movement about said axis Y—Y, as necessary to obtain lift.

Of course, the expression "horizontal" referring to an element of the system implies that the aircraft on which said system is mounted is in a balanced position.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claim.

What I claim is:

For use on an aircraft including a frame, a lift producing and propelling rotary blade device which comprises, in combination, a rotary support journalled in said frame about an axis fixed with respect to said frame and oblique to the horizontal for the normal flying position of said aircraft, means for driving said rotary support about said axis, a two-bladed airscrew, including two blades and a hub rigidly interconnecting them, pivotally mounted on said support about an axis at right angles to the first mentioned axis, a part pivotally mounted in said hub about an axis at right angles to the second mentioned axis, a spindle rigid with said part extending in a direction perpendicular to both of the second and third mentioned axes, a rod longitudinally slidable in said frame extending in the vertical direction for the normal flying position of said aircraft, and a bearing carried by said rod arranged slidably to accommodate the end of said spindle.

References Cited in the file of this patent

UNITED STATES PATENTS

| Number | Name | Date |
|---|---|---|
| 1,052,378 | Porter | Feb. 4, 1913 |
| 1,497,302 | Ray | June 10, 1924 |
| 2,039,628 | Brown | May 5, 1936 |

FOREIGN PATENTS

| Number | Country | Date |
|---|---|---|
| 14,455 | Great Britain | June 15, 1910 |
| 302,752 | Great Britain | Dec. 27, 1928 |
| 554,454 | Great Britain | July 5, 1943 |